(12) United States Patent
Ohtoshi

(10) Patent No.: US 12,175,313 B2
(45) Date of Patent: Dec. 24, 2024

(54) IMAGE FORMING APPARATUS AND METHOD OF READING TEST SHEET

(71) Applicant: SHARP KABUSHIKI KAISHA, Sakai (JP)

(72) Inventor: Takenori Ohtoshi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/244,915

(22) Filed: Sep. 12, 2023

(65) Prior Publication Data

US 2024/0160873 A1 May 16, 2024

(30) Foreign Application Priority Data

Nov. 15, 2022 (JP) .................................. 2022-182943

(51) Int. Cl.

| | | |
|---|---|---|
| *G06K 15/10* | (2006.01) | |
| *G06K 15/02* | (2006.01) | |
| *H04N 1/00* | (2006.01) | |
| *H04N 1/04* | (2006.01) | |
| *H04N 1/047* | (2006.01) | |
| *H04N 1/10* | (2006.01) | |

(52) U.S. Cl.
CPC ....... *G06K 15/027* (2013.01); *H04N 1/00819* (2013.01); *H04N 1/0461* (2013.01); *H04N 1/047* (2013.01); *H04N 1/1061* (2013.01); *H04N 2201/0081* (2013.01)

(58) Field of Classification Search
CPC ............. G06K 15/027; H04N 1/00819; H04N 1/0461; H04N 1/047; H04N 1/1061; H04N 2201/0081
See application file for complete search history.

(56) References Cited

U.S. PATENT DOCUMENTS

| | | | | |
|---|---|---|---|---|
| 2011/0122455 A1* | 5/2011 | Elliot | ................. | H04N 1/00034 |
| | | | | 358/488 |
| 2014/0022609 A1* | 1/2014 | Tanigawa | ............... | H04N 1/047 |
| | | | | 358/488 |
| 2019/0068839 A1* | 2/2019 | Narita | ........................ | G06T 7/90 |
| 2020/0209796 A1* | 7/2020 | Hidaka | .............. | G03G 15/5025 |
| 2020/0358916 A1* | 11/2020 | Tomii | ................. | H04N 1/00708 |
| 2021/0075918 A1* | 3/2021 | Tomii | ................. | H04N 1/00087 |
| 2022/0038603 A1* | 2/2022 | Shiga | ................. | H04N 1/00087 |

FOREIGN PATENT DOCUMENTS

JP   2011-041099 A   2/2011

\* cited by examiner

*Primary Examiner* — Dung D Tran
(74) *Attorney, Agent, or Firm* — ScienBiziP, P.C.

(57) ABSTRACT

An image forming apparatus automatically adjusts a printing distance from a sheet edge on the basis of a result obtained by reading, with a reader, a test sheet printed by an image former. The image former prints a solid cover sheet of a predetermined color other than white having a void portion on four sides. The test sheet is placed on OC glass having a first size guide and a second size guide on its periphery, in alignment with the origin of the first size guide and the second size guide. The reader reads the test sheet in a state in which the cover sheet is placed on the test sheet so that the void portion is disposed outside the first size guide and the second size guide.

7 Claims, 14 Drawing Sheets

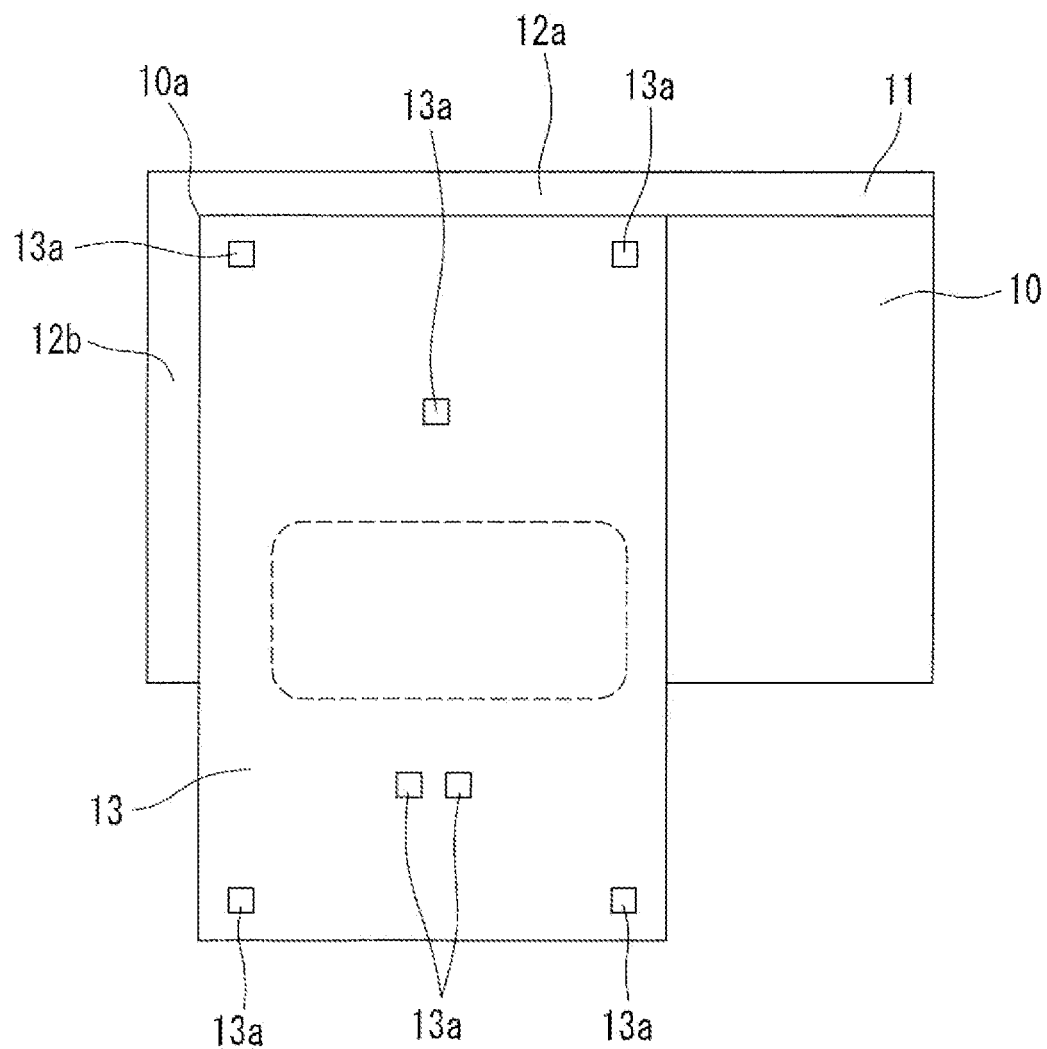

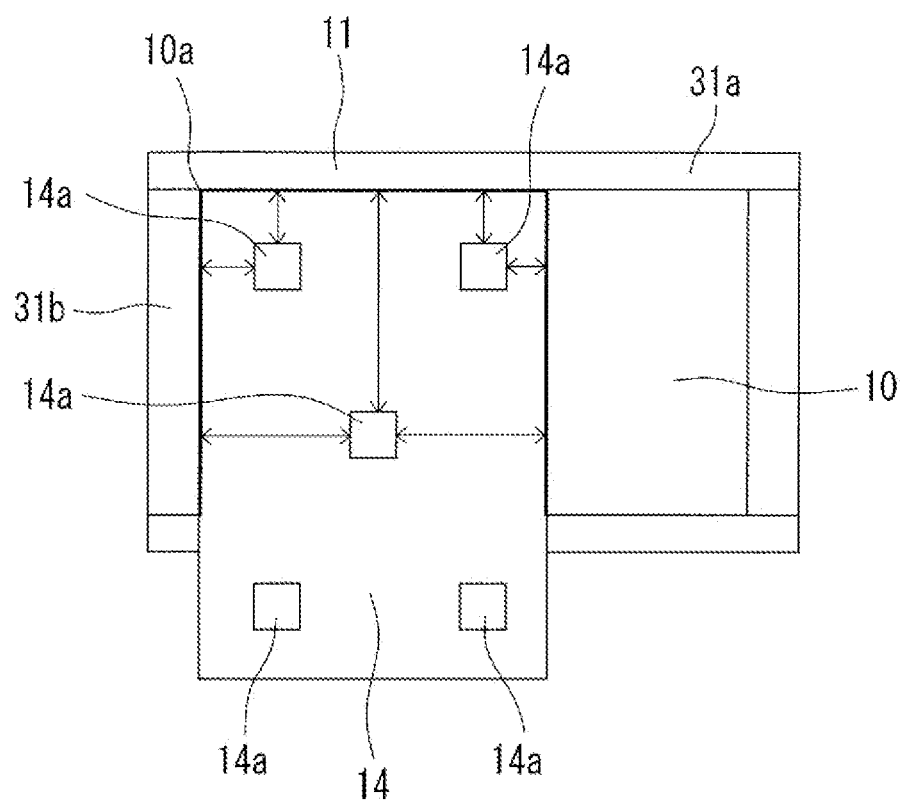

IMAGE FORMING APPARATUS AND METHOD OF READING TEST SHEET

BACKGROUND OF THE INVENTION

Field of the Invention

The disclosure relates to an image forming apparatus and a method of reading a test sheet, capable of aligning the positions of images to be printed on the front and back sides of a sheet.

Description of the Background Art

As an image forming apparatus capable of aligning the positions of images to be printed on the front and back sides of a sheet, there is known an image forming apparatus that prints a recording medium with a misalignment check pattern (test pattern) and reads the recording medium with a scanner to correct the printing position.

A conventional image forming apparatus capable of aligning the positions of images to be printed on the front and back sides of a sheet has the configuration described above.

However, in the conventional configuration, although the recording medium with the test pattern is read by a scanner, there is a problem in that the edge of the paper cannot be read when the cover covering the read surface is white relative to normally white paper, or the reading accuracy deteriorates, and the accurate distance between the edge of the paper and the test pattern cannot be measured, and the accuracy of the correction deteriorates.

The disclosure has been made to solve the above-described problems, and an object of the disclosure is to provide an image forming apparatus capable of measuring the accurate distance between an edge of a sheet and a test pattern, and as a result, capable of accurately aligning positions of images to be printed on the front and back sides of a sheet.

SUMMARY OF THE INVENTION

An image forming apparatus according to the disclosure automatically adjusts a printing distance from a sheet edge on the basis of a result obtained by reading, with a reader, a test sheet printed by an image former while the upper surface of the test sheet is covered with a cover sheet coated with a predetermined color other than white. The test sheet is placed on OC glass having an OC frame around a reading area so as to be aligned with an origin of the OC frame, and the reader reads the test sheet in a state in which the cover sheet is placed on the test sheet such that two side edges of the cover sheet on the side of the origin are disposed outside the reading area.

Preferably, the test sheet may be printed by the image former and have a void area on four sides, and when the test sheet is read, the void area on the two sides of the cover sheet on the side of the origin may be disposed outside the reading area.

More preferably, edges of the two sides of the cover sheet on the side of the origin may be disposed at positions overlapping the OC frame when the test sheet is read.

The cover sheet may be provided with a mark for aligning the cover sheet on the OC glass.

The mark for aligning the cover sheet on the OC glass may be aligned with the OC frame on the side of the origin.

The OC frame may preferably include an alignment portion for aligning the position of the cover sheet.

Preferably, when the test sheet is read, two of the cover sheets may be placed on the test sheet to cover the entire reading area with the cover sheets.

When the test sheet is read by the reader, four sides of the test sheet may be placed on the OC glass, and a print position on one side may be read at a time.

When the two cover sheets are used, at least one of the two cover sheets may have a mark for aligning a position of the other cover sheet.

Another aspect of the disclosure provides a method of reading a test sheet when a printing distance from a sheet edge is automatically adjusted based on a result of reading, by a reader, the test sheet on which an image is formed by an image former. A method of reading a test sheet includes: placing a rectangular test sheet on a rectangular reading area having an OC frame around the reading area along two sides joining at the origin of the OC frame; placing a rectangular cover sheet coated with a predetermined color other than white on the test sheet such that the two side edges on the side of the origin are disposed outside the reading area; and causing the reader to read the test sheet in a state in which the cover sheet is placed on the test sheet.

According to the disclosure, the test sheet is placed in alignment with the origin of the OC frame provided around the OC glass, and the test sheet is read after covering the test sheet with the solid cover sheet of a predetermined color other than white. Therefore, it is possible to accurately detect the position of test patterns on the test sheet relative to the OC frame. As a result, it is possible to provide an image forming apparatus and a method of reading a test sheet, capable of aligning the positions of images to be printed on the front and back sides of a sheet.

The above object, other objects, features and advantages of the disclosure will become clearer from the detailed description of the embodiments described below with reference to the drawings.

BRIEF DESCRIPTION OF THE DRAWINGS

FIG. 1A is a diagram illustrating the placement of a test sheet on OC glass provided in a reader of an image forming apparatus according to a first embodiment of the disclosure.

FIG. 4A is a diagram illustrating the placement of a test sheet on OC glass according to a fourth embodiment of the disclosure.

DESCRIPTION OF THE PREFERRED EMBODIMENTS

First Embodiment

Figure 1B:
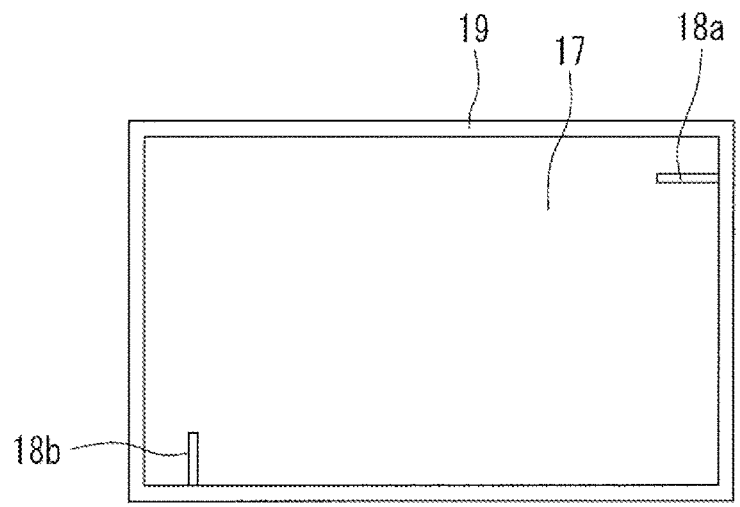
FIG. 1B is a diagram illustrating a cover sheet according to the first embodiment of the disclosure.

Embodiments of the disclosure will now be described with reference to the accompanying drawings. FIG. 1A is a diagram illustrating the placement of a test sheet on OC glass of a reader of an image forming apparatus according to the first embodiment of the disclosure, and illustrates a horizontally long OC (transparent) glass 10 on which a sheet is placed, an OC frame 11 provided along the left edge and the upper edge of the OC glass 10, and a test sheet 13 placed on the OC glass 10. Here, the OC frame 11 includes a first size guide 12a extending in the horizontal (X) direction and a second size guide 12b extending in the vertical (Y) direction.

The intersection of the first size guide 12a and the second size guide 12b constitutes the origin 10a of the OC frame 11, and the vertically long rectangular test sheet 13 is aligned with the origin 10a of the OC frame 11 and is placed on the OC glass 10 along the first size guide 12a and the second size guide 12b. Here, the first size guide 12a and the second size guide 12b have indicators for the size of sheets placed on the OC glass 10.

Figure 1C:
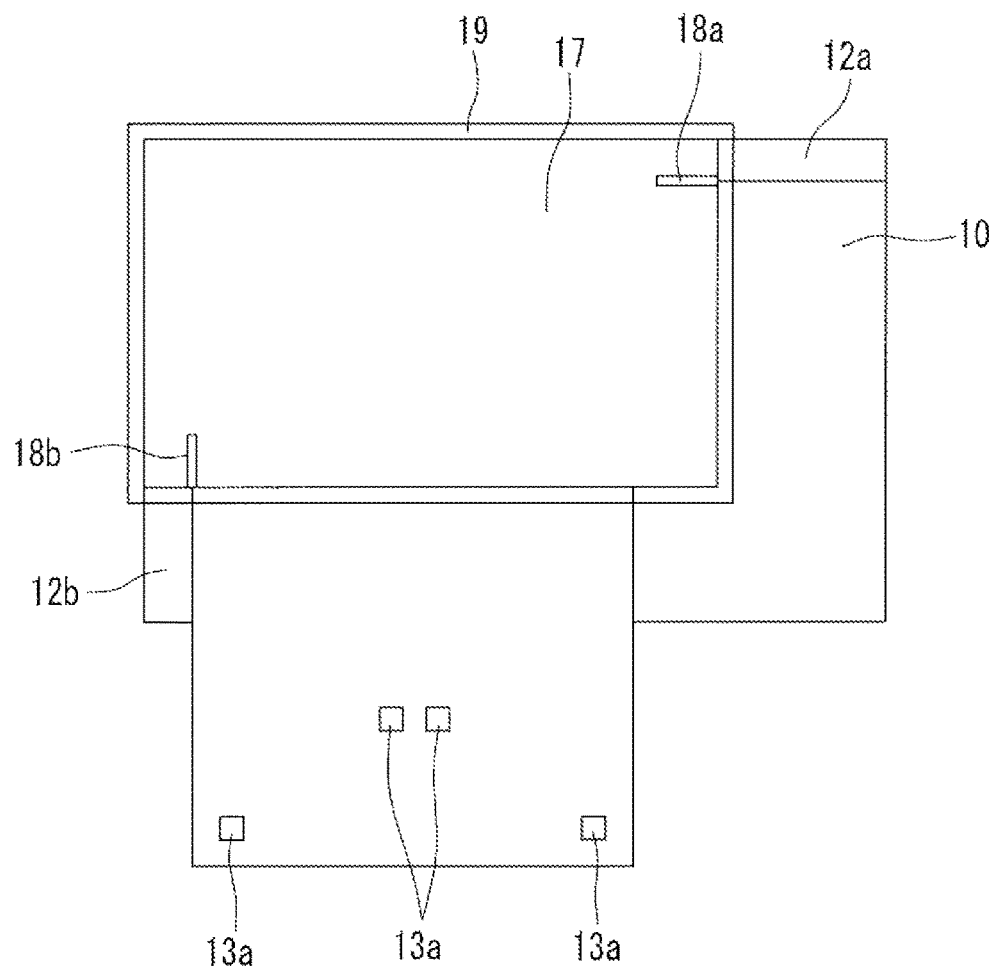
FIG. 1C is a diagram illustrating a state in which the cover sheet is placed so as to cover the upper portion of the test sheet according to the first embodiment of the disclosure.

FIG. 1B is a diagram illustrating a cover sheet 17 according to the first embodiment of the disclosure, and FIG. 1C is a diagram illustrating a state in which the cover sheet 17 is placed so as to cover the upper portion of the test sheet 13 according to the first embodiment of the disclosure. A method of placing the test sheet 13 on the OC glass 10 according to the first embodiment of the disclosure will be explained with reference to FIGS. 1A to 1C.

The test sheet 13 is image-formed by an image former of an image forming apparatus that adjusts the image position, and is vertically long rectangle, as illustrated in FIG. 1A. Predetermined test patterns 13a are printed in the vicinity of the four corners of the test sheet 13 on the front side, one at the middle of the left-right direction above the center, and two at the middle of the left-right direction below the center. The same test patterns 13a are printed on the back side of the test sheet 13. A test pattern 13a is not provided in the central portion of the test sheet 13 (the portion indicated by a dotted line in FIG. 1A).

Referring to FIG. 1B, the cover sheet 17 has a rectangular shape that is at least wider than the test sheet 13. In the disclosure, the cover sheet 17 is printed in a color (for example, gray) other than white by the image former of the image forming apparatus, and a white void portion (void area) 19 having a certain width is formed around the four sides of the outer periphery of the cover sheet 17. However, the void area may not necessarily be provided. The inside of the white void portion 19 is coated in a color other than white (for example, gray). The cover sheet 17 placed on the OC glass 10 has alignment marks 18a and 18b. The mark 18a is an upper edge line or a horizontal line parallel to the upper void area provided in the right upper edge portion of the cover sheet 17. The mark 18b is a left edge line or a vertical line parallel to the left void area provided in the left lower edge portion of the cover sheet 17.

When the cover sheet 17 has a void area and the horizontally long mark 18a is aligned along a first predetermined line of the reader, the mark 18a is positioned so that the white void portion (void area) 19 that is parallel to and adjacent to the mark 18a of the cover sheet 17 is disposed on the outer and upper side of the OC glass 10 (outside the upper side of the reading area). The mark 18a is arranged horizontally in the vicinity of the upper edge of the void area, parallel to the upper edge of the void area, inside the upper edge of the void area, and in the vicinity of the right edge of the void area.

When the cover sheet 17 has a void area and the vertically long mark 18b is aligned along a second predetermined line of the reader, the mark 18b is positioned so that the white void portion (void area) 19 that is parallel to and adjacent to the mark 18b of the cover sheet 17 is disposed on the outer left side of the OC glass 10 (outside the left side of the reading area). The mark 18b is arranged vertically in the vicinity of the left edge of the void area, parallel to the left edge of the void area, inside the left edge of the void area, and in the vicinity of the lower edge of the void area.

When the cover sheet 17 has no void area and the horizontally long mark 18a is aligned along a first predetermined line of the reader, the mark 18a is positioned so that the edge (upper edge) of the cover sheet 17 that is parallel to and adjacent to the mark 18a of the cover sheet 17 is disposed on the outer and upper side of the OC glass 10 (outside the upper side of the reading area). The mark 18a is arranged horizontally and parallel to the upper edge of the cover sheet 17, inside the upper edge of the cover sheet 17, and in the vicinity of the right edge of the cover sheet 17.

When the cover sheet 17 has no void area and the vertically long mark 18b is aligned along a second predetermined line of the reader, the mark 18b is positioned so that the edge (left edge) of the cover sheet 17 that is parallel to and adjacent to the mark 18b of the cover sheet 17 is disposed on the outer and upper side of the OC glass 10 (outside the left side of the reading area). The mark 18b is arranged vertically in the vicinity of the left edge of the cover sheet 17, parallel to the left edge of the cover sheet 17, inside the left edge of the cover sheet 17, and in the vicinity of the lower left edge of the cover sheet 17.

The first predetermined line is a line along the edge of the first size guide 12a adjacent to the surface of the OC glass 10, a line inside the first size guide 12a, and a line along the upper edge of the reading area, or may be an alignment mark drawn on the first size guide 12a.

The second predetermined line is a line along the edge of the second size guide 12b adjacent to the surface of the OC glass 10, a line inside the second size guide 12b, and a line along the left edge of the reading area, or may be an alignment mark drawn on the second size guide 12b.

Referring to FIG. 1C, as described above, the cover sheet 17 is placed so that the marks 18a and 18b are aligned along the first predetermined line and the second predetermined line, whereby a portion including at least the origin of the upper and left edges of the test sheet 13 is arranged so as to be completely covered with an area coated in a color (for example, gray) other than white of the cover sheet 17.

In the present embodiment, by aligning the upper left corner of the test sheet 13 with the origin 10a in this manner, aligning two orthogonal sides of the test sheet 13 with the first size guide 12a and the second size guide 12b, and placing the cover sheet 17 having a color other than white on two sides of the test sheet 13 joining at at least the origin or three sides including the two sides joining at at least the origin, the upper surface of the test sheet 13 is no longer white. In this state, by reading the test sheet 13 with a scanner (not illustrated) provided under the OC glass 10, the upper edge, the left edge, or the upper edge and the left and right edges and the center test pattern 13a of the test sheet 13 can be reliably detected.

The test sheet 13, which has the same test patterns 13a on the front and back sides, is read a total of four times: reading the upper portion of the test sheet 13 in the state illustrated in FIG. 1A; rotating the sheet 180 degrees vertically and reading the bottom portion of the sheet; and then reading the upper and lower portions of the back side. The specifics of this will be explained later.

As a result, an image forming apparatus can be provided that is capable of measuring the accurate distance between an edge of the test sheet 13 and the test patterns 13a and capable of accurately aligning positions of images to be printed on the front and back sides of a sheet.

Second Embodiment

Figure 2A:
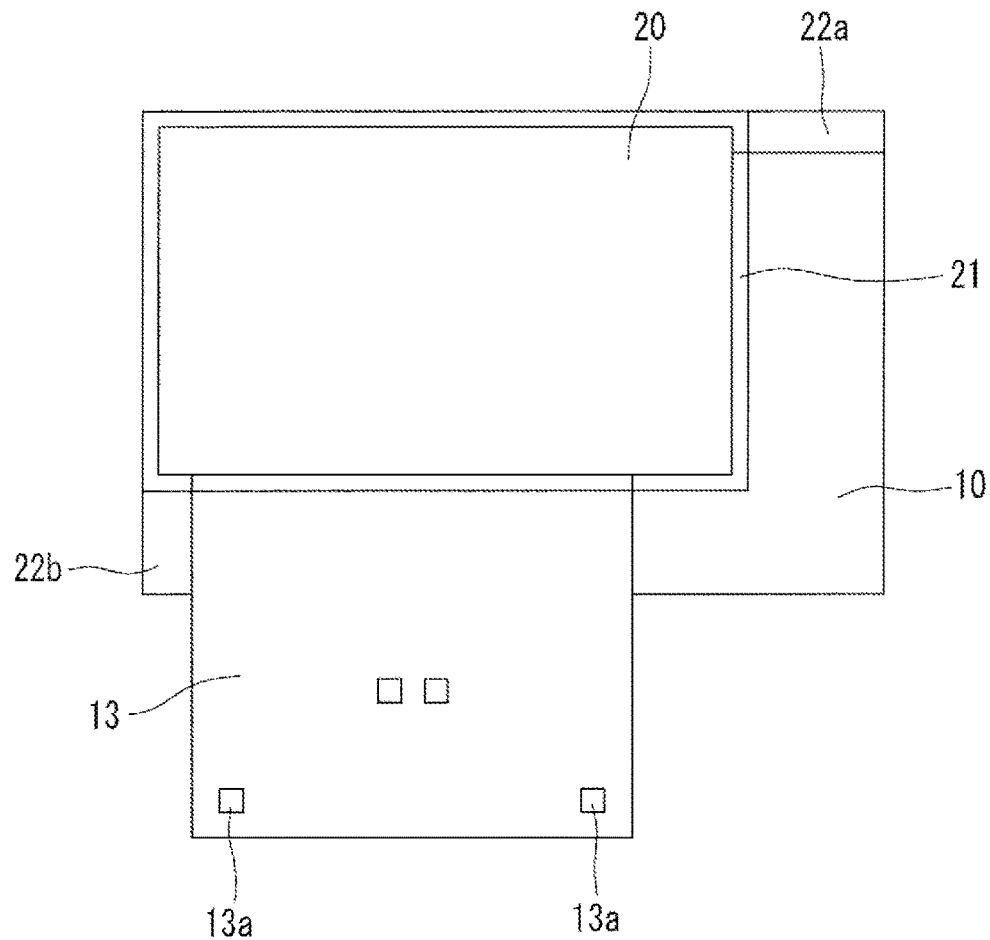
FIG. 2A is a diagram illustrating the placement of a test sheet and a cover sheet on OC glass in a first example of a second embodiment of the disclosure.

The second embodiment of the disclosure will now be described. The second embodiment of the disclosure includes a first example and a second example. FIG. 2A is a diagram illustrating the placement of a test sheet 13 and a cover sheet 20 on OC glass 10 in the first example of the second embodiment of the disclosure. Similar to FIG. 1A, FIG. 2A illustrates a state in which the test sheet 13 is placed with its upper left corner abutting on the origin 10a (see FIG. 1A) and along a first size guide 22a and a second size guide 22b, and the cover sheet 20 is placed with its left edge aligned with the left edge of the second size guide 22b and its upper edge aligned with the upper edge of the first size guide 22a. In the first example, the width of a void portion 21 of the cover sheet 20 is smaller than the width of the first size guide 22a and the width of the second size guide 22b.

Figure 2B:
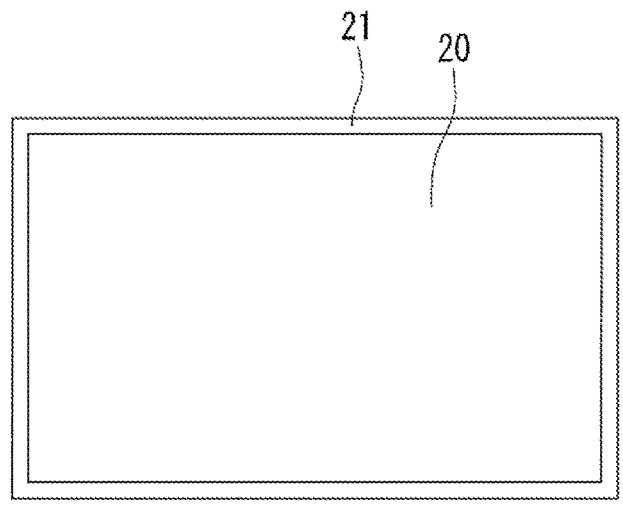
FIG. 2B is a diagram illustrating the cover sheet according to the second embodiment of the disclosure.

FIG. 2B is a diagram illustrating the cover sheet 20 according to the second embodiment of the disclosure, and corresponds to FIG. 1B. Referring to FIG. 2B, in the present embodiment, the cover sheet 20 is provided with a white void portion 21 similar to that in FIG. 1B, and the inside of the white void portion 21 has a color other than white, but unlike the previous embodiment, the cover sheet is not provided with a vertical line or a horizontal alignment line.

Figure 2C:
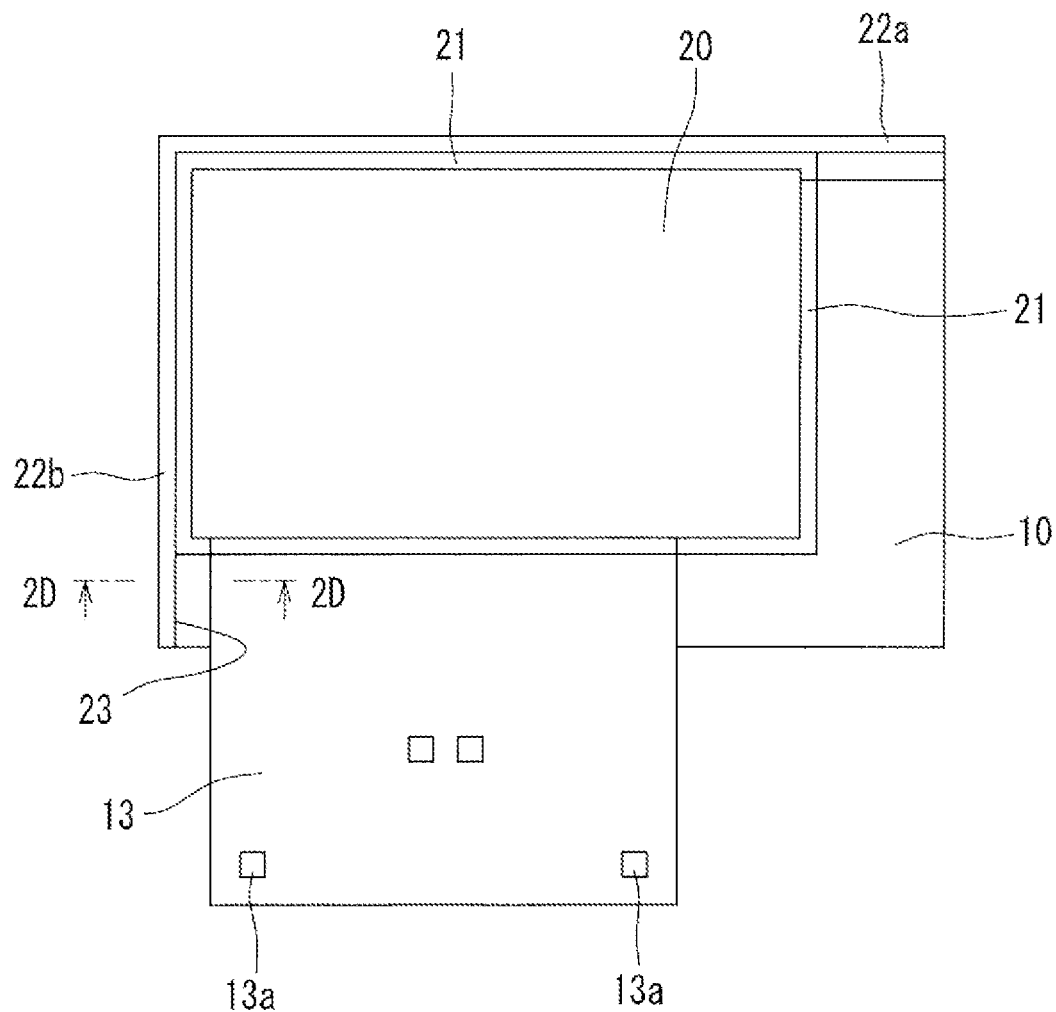
FIG. 2C is a diagram illustrating the placement of a test sheet and a cover sheet on OC glass in a second example of a second embodiment of the disclosure.

FIG. 2C is a diagram illustrating the placement of the test sheet 13 and the cover sheet 20 on the OC glass 10 in the second example of the second embodiment of the disclosure, and the position covered by the cover sheet 20 is different from that in the first example illustrated in FIG. 2A.

Figure 2D:
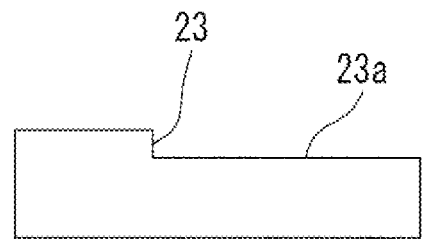
FIG. 2D is a diagram illustrating a cross-sectional shape of a step provided in a first size guide in the second example of the second embodiment of the disclosure.

In the second example of the second embodiment of the disclosure, a step 23 is provided in each of the first size guide 22a and the second size guide 22b, and a cross-sectional shape of the step 23 (a cross-section taken along line 2D-2D in FIG. 2C) is illustrated in FIG. 2D. Referring to FIG. 2D, the lower portion 23a of the step 23 on the OC glass 10 side is wider than the void portion 21 of the cover sheet 20 in the widthwise direction.

A method of placing the test sheet 13 on the OC glass 10 according to the second embodiment of the disclosure will be explained with reference to FIGS. 2A to 2D.

The present embodiment is the same as the previous embodiment in that the upper left corner of the test sheet 13 is aligned with the origin 10a, two orthogonal sides of the test sheet 13 are aligned along the first size guide 22a and the second size guide 22b, and the cover sheet 20 is placed on the test sheet 13.

In the present embodiment, the placement position of the cover sheet 20 is different from that of the previous embodiment. That is, in the first example of the present embodiment, the cover sheet 20 is aligned with the upper edges and the left edges of the first size guide 22a and the second size guide 22b (see FIG. 2A), whereas in the second example, the cover sheet 20 is placed such that the edges of the two sides join at the upper left corner are aligned with the steps (protrusions) 23 of the first size guide 22a and the second size guide 22b. In the first example, since the width of the void portion 21 is smaller than the width of the first size guide 22a and the width of the second size guide 22b, the upper surface of the test sheet 13 is not white, and the left and right edges of the upper portion of the test sheet 13 can be reliably detected.

In the second example, since the size of the lower portion 23a of the step 23 adjacent to the OC glass 10 is larger than the size of the void portion 21 of the cover sheet 20 in the widthwise direction, by placing the cover sheet 20 in this manner, the upper surface of the test sheet 13 is not white, and the left and right edges of the upper portion of the test sheet 13 can be reliably detected.

As a result, an image forming apparatus can be provided that is capable of measuring the accurate distance between an edge of the test sheet 13 and the test patterns 13a and capable of accurately aligning positions of images to be printed on the front and back sides of a sheet.

In the second example of the second embodiment, the case where the steps 23 of the first size guide 22a and the second size guide 22b are used as the alignment portions has been described, but alternatively, protrusion may be provided, or print marks may be provided on the OC frame in place of the steps.

In the first example, which is applicable even when the cover sheet has no void area, the width of the first size guide 22a and the width of the second size guide 22b need only be wide enough (e.g., 5 mm) to allow the placement of a sheet, and in the second example, the width of lower portions 23a of the steps 23 adjacent to the OC glass 10 need only be wide enough (e.g., 5 mm) to allow the placement of a sheet.

Third Embodiment

The third embodiment of the disclosure will now be described. The present embodiment is the same as the previous embodiment in that the entire OC glass is covered, but is different from the previous embodiment in that the reference of the placement position of the cover sheet is not size guides but edge line of a cabinet provided outside the OC glass in the surroundings of the image forming apparatus. In the present embodiment, two vertically long cover sheets having similar dimensions as the OC glass are placed side by side in the horizontal direction.

Figure 3A:
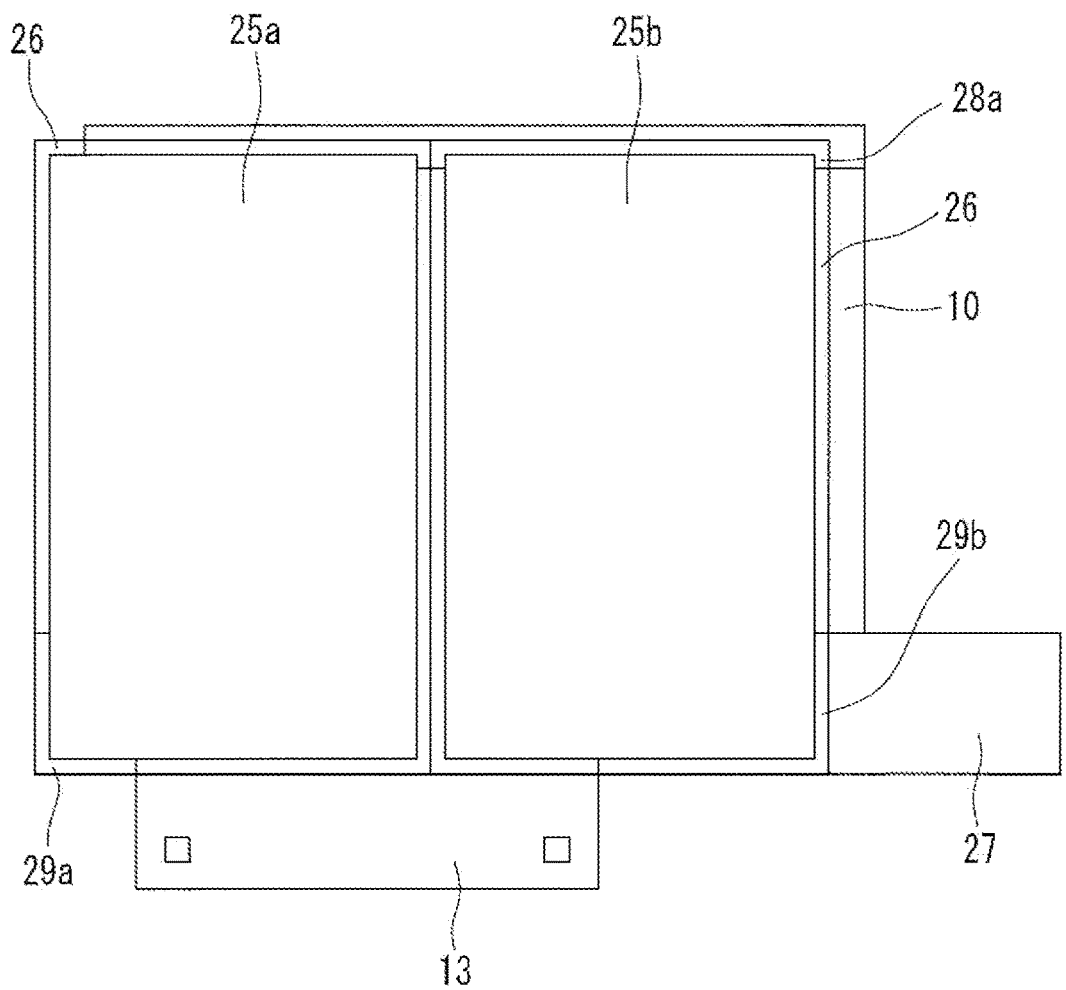
FIG. 3A is a diagram illustrating the placement of a test sheet and two cover sheets on OC glass in a third embodiment of the disclosure.
Figure 3B:
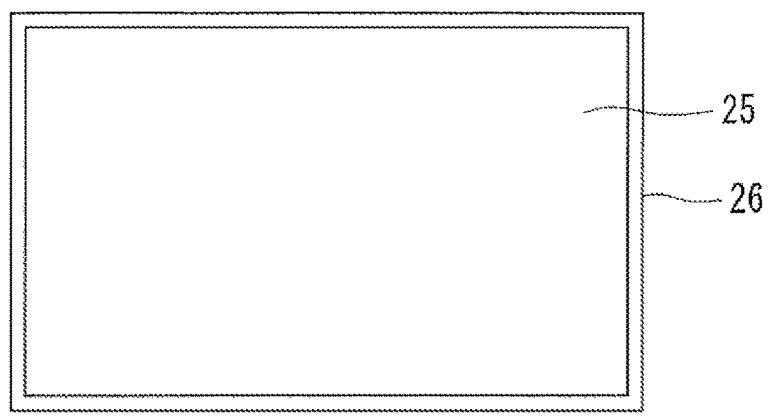
FIG. 3B is a diagram illustrating the cover sheet according to the third embodiment of the disclosure.

FIG. 3A is a diagram illustrating the placement of a test sheet 13 and two cover sheets 25a and 25b of the third embodiment of the disclosure on OC glass 10; and FIG. 3B is a diagram illustrating one of the cover sheets 25 of the third embodiment of the disclosure. Since the two cover sheets 25 used here are the same, they are denoted by the reference sign "25," and when the two sheets are arranged side by side, they are denote by reference signs "25a" and "25b."

Referring to FIG. 3B, in the present embodiment, each cover sheet 25 is provided with a white void portion 26 on the four side along the outer periphery; the inside of the white void portion 26 has a color other than white; and the cover sheet 25 is not provided with a vertical line or a horizontal alignment line.

In the present embodiment, a line 27 (a resin exterior part provided on the outside of the OC glass of the image forming apparatus) of an edge of the peripheral cabinet extending in the horizontal direction with a constant widthwise size is provided below the OC glass 10, and the two cover sheets 25a and 25b are arranged such that the left and right edges thereof are aligned with the line 27 of the edge of the peripheral cabinet. In the present embodiment, the two cover sheets 25a and 25b are continuously arranged in the vertical direction such that two adjacent sides in the vertical direction are in contact with each other.

A method of placing the test sheet 13 on the OC glass 10 according to the third embodiment of the disclosure will be explained with reference to FIGS. 3A and 3B.

Also, in the present embodiment, the test sheet 13 is placed on the OC glass 10 along the origin 10a of the OC glass 10 and the first size guide 28a, and two rectangular cover sheets 25a and 25b are placed on the test sheet 13 side by side. The first cover sheet on the left is aligned with the left edge of the cabinet, and the second cover sheet on the right is aligned with the right edge of the cabinet.

At this time, the lower left corner of the cover sheet 25a placed on the left side covers a second size guide (not illustrated) extending in the vertical direction along the left edge of the OC glass 10, and the cover sheet is placed such that the void portion is positioned outside of the OC glass 10. Cover sheet positioning portions 29a and 29b are arranged so as to position the lower left corner of the left cover sheet 25a and the lower right corner of the right cover sheet 25b inside the void portion 26. This is for the purpose of preventing the void portion 26 from entering the reading area (inside the OC glass 10) of the scanner (not illustrated) by positioning the cover sheets inside the void portion 26 in this way.

By placing the cover sheets 25a and 25b in this manner, the upper surface of the test sheet 13 is not white, and the upper edge, the left and right edges, and the test patterns of the test sheet 13 can be reliably detected.

As a result, an image forming apparatus can be provided that is capable of measuring the accurate distance between an edge of the test sheet 13 and the test patterns 13a and capable of accurately aligning positions of images to be printed on the front and back sides of a sheet.

Fourth Embodiment

The fourth embodiment of the disclosure will now be described. In the present embodiment, a test sheet 14 is not covered with a cover sheet, and an OC cover 33 covering the OC glass 10 is opened at the time of reading by a reader. By opening the OC cover and reading the test sheet, no light is reflected from the OC cover in the area other than the area of the test sheet 14 read by a scanner (not illustrated) of the reader, and the same effect as covering the test sheet with the cover sheet can be achieved.

FIG. 4A is a diagram illustrating the placement of the test sheet 14 on the OC glass 10 according to the fourth embodiment of the disclosure.

Here, the upper left corner of the vertically long rectangular test sheet 14 is aligned with the origin 10a of a first size guide 31a and a second size guide 31b, and two sides joining at the upper left corner of the test sheet 14 are aligned along two sides of the first size guide 31a and the second size guide 31b orthogonal to each other at the origin 10a. Further, the test sheet 14 is provided with square test patterns 14a in the vicinity of the central portion and the four corners, and the three test patterns 14a above the central portion are positioned in the reading area on the OC glass 10.

Figure 4B:
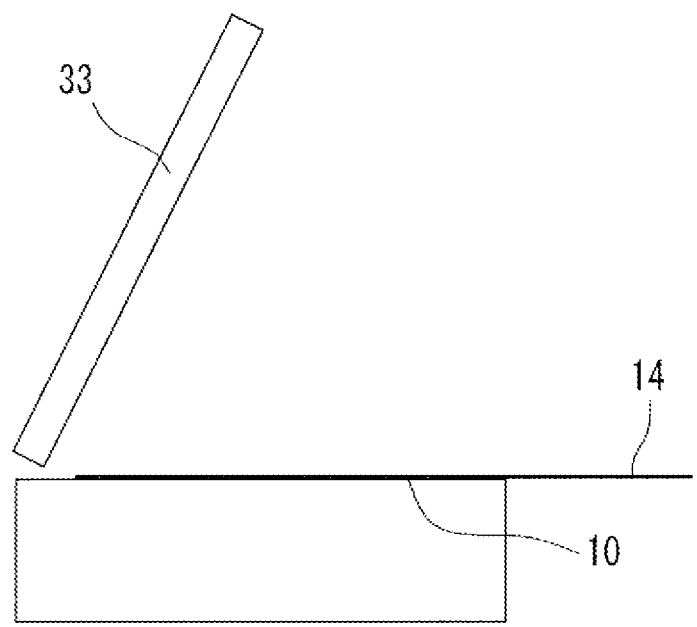
FIG. 4B is a diagram illustrating a reading state of a test sheet in which the OC cover is opened in the fourth embodiment of the disclosure.
Figure 4C:
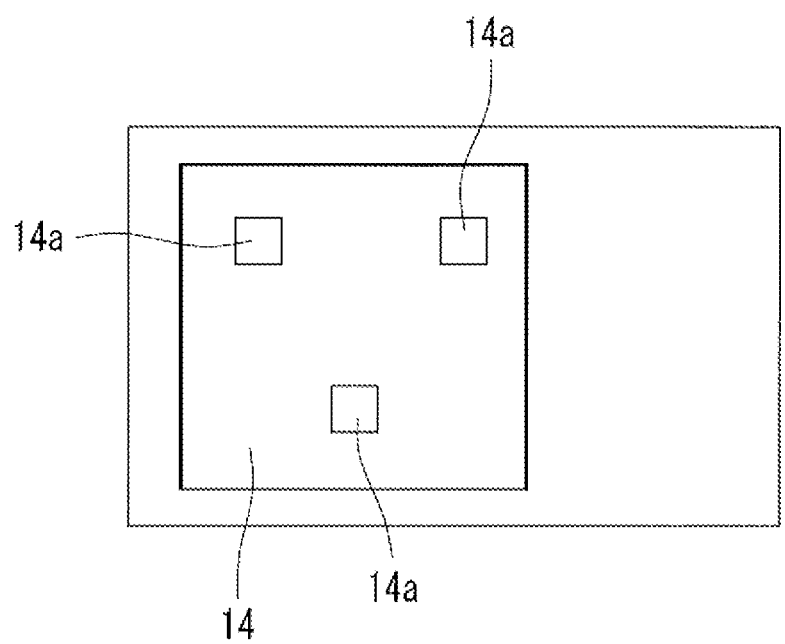
FIG. 4C is a diagram illustrating an image of image data obtained by opening the OC cover and reading the test sheet.

FIG. 4B is a diagram illustrating a reading state of the test sheet 14 when the OC cover 33 is opened in the fourth embodiment of the disclosure, and FIG. 4C is a diagram illustrating an image of image data obtained by reading the test sheet 14 with the OC cover 33 opened. As illustrated in FIG. 4B, since the test sheet 14 is read by a scanner (not illustrated) with the OC cover 33 opened, light emitted from the reader is not reflected in an area where there is no test sheet 14, and the density is recognized to be high.

As a result, an edge of a sheet can be accurately read without using a cover sheet.

Fifth Embodiment

The fifth embodiment of the disclosure will now be described. The OC frame around OC glass in the present embodiment is provided on the entire periphery of the OC glass as in the fourth embodiment.

Figure 5A:
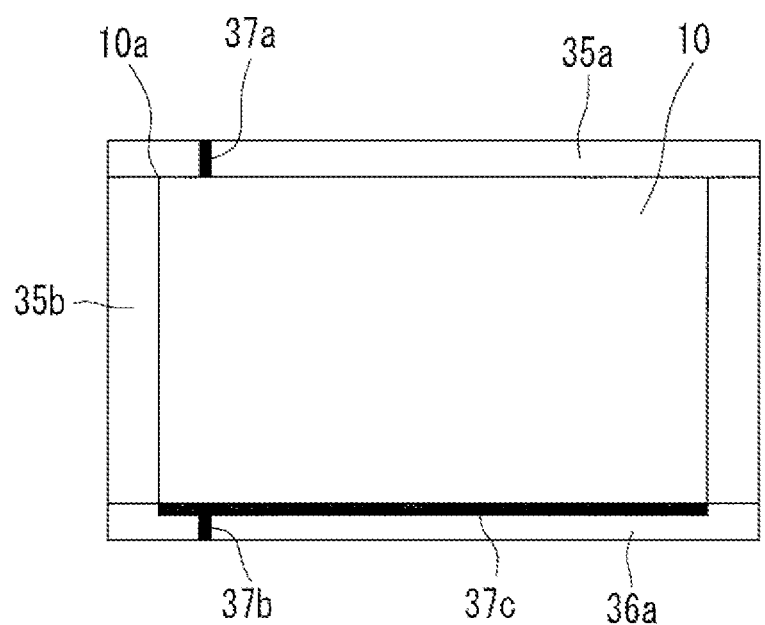
FIG. 5A is a diagram illustrating mark for aligning a test sheet provided around OC glass according to a fifth embodiment of the disclosure.
Figure 5B:
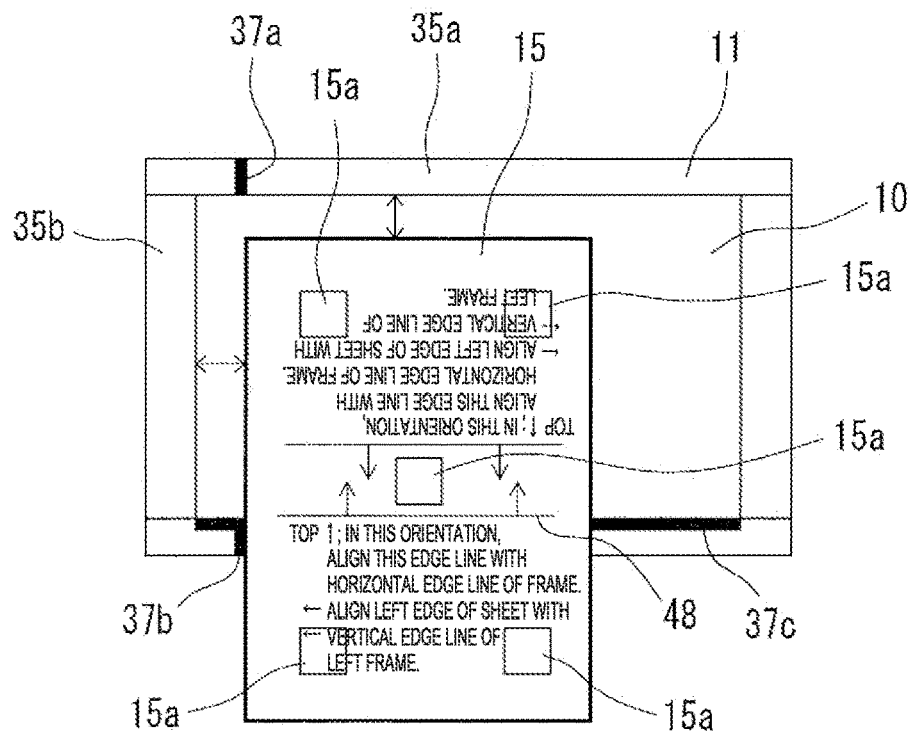
FIG. 5B is a diagram illustrating the placement of a test sheet on OC glass according to the fifth embodiment of the disclosure.

FIG. 5A is a diagram illustrating marks 37a, 37b, and 37c for aligning a test sheet provided around the OC glass 10 according to the fifth embodiment of the disclosure, but the mark 37a may not be provided. Referring to FIG. 5A, a first size guide 35a and an OC frame 36a extending in the horizontal direction of the lower OC frame are provided with the marks 37a and 37b (which are displayed in black in the drawing, but may actually be displayed in another color such as green, and are, here, assumed to be green) for aligning in the vertical direction of the test sheet. FIG. 5B is a diagram illustrating the placement of a test sheet 15 according to the fifth embodiment of the disclosure on the OC glass 10, and is a diagram illustrating a state in which the test sheet 15 is placed with its left edge aligned with the predetermined positions of the marks 37a and 37b. The marks 37a and 37b are lines extending in the vertical direction and having the widths of the first size guide 35a and the lower OC frame, and the mark 37c is a line extending in the horizontal direction at the upper edge of the lower OC frame.

The marks 37a and 37b correspond to alignment marks of the OC frame 11 in the X-direction.

Here, the test sheet 15 is placed on the OC glass 10 with a gap between the two sides joining at the upper left corner of the test sheet 15 and the first size guide 35a and the second size guide 35b.

Referring to FIG. 5B, the test sheet 15 is provided with a description, and it includes five test patterns 15a similar to those described with reference to FIG. 4A, two lines (actually displayed in another color of the marks and characters, such as green) extending horizontally and symmetrically above and below the central test pattern 15a, a pair of arrows (actually displayed in another color of the marks and characters, such as green) extending from the two lines toward the center, and the following description.

"Top ↑; In this orientation, align this edge line with the green horizontal line of the frame. ←Align the edge of the sheet with the green vertical, left line of frame."

Here, with reference to FIG. 5B, the meaning of this description is "Top ↑; In this orientation, align this edge line 48 with the green mark 37c (the alignment mark of the lower OC frame 11 in the Y-direction) of the lower OC frame 11. ←Align the edge of the sheet with the green mark 37b of the lower OC frame 11 on the left (the alignment mark of the OC frame 11 in the X-direction)." By reading the test sheet 15 in this way, it is possible to read the upper half (half of the long side) of the rectangular test sheet 15 having long sides including the test pattern 15a at the center.

The test sheet 15 is then vertically rotated by 180 degrees to read the lower half (the remaining half), and then the upper side and the lower side of the back surface are read, resulting in a total of four readings as described above. In this way, the distances from the edge of the test sheet 15 to the OC frame 11, the positions and sizes of the test patterns 15a on the front side, and the positions and sizes of the test patterns 15a on the back side are read.

Figure 5C:
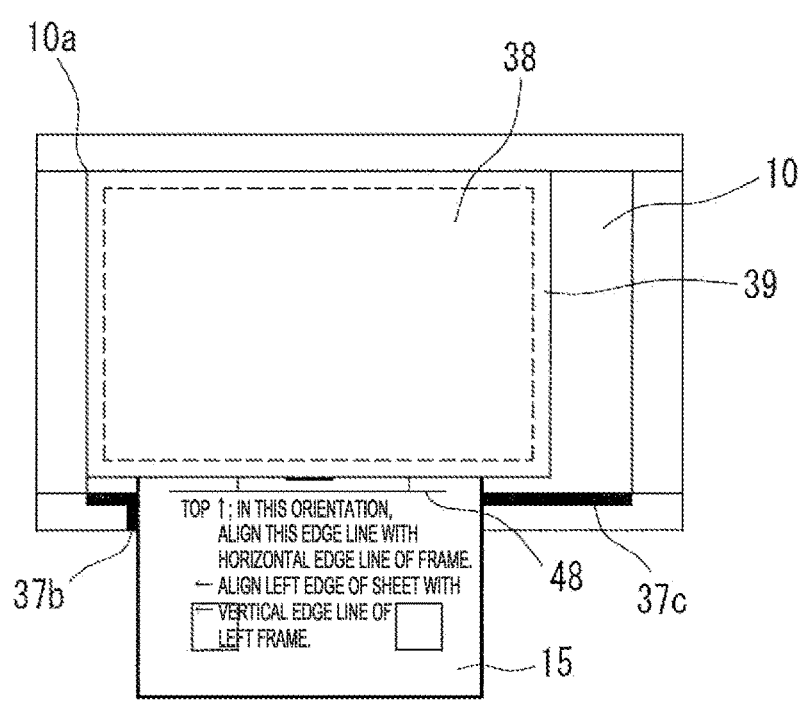
FIG. 5C is a diagram illustrating a state in which a cover sheet is placed on the test sheet according to the fifth embodiment of the disclosure.

FIG. 5C is a diagram illustrating the placement of a cover sheet 38 on the test sheet 15 according to the fifth embodiment of the disclosure, and is a diagram illustrating a state in which the cover sheet 38 is placed on the test sheet 15 illustrated in FIG. 5B so as to be aligned with the origin 10a of the first size guide 35a and the second size guide 35b. Here, the cover sheet 38 is not white as before and has a white void portion 39 on the periphery. In this state, the OC glass 10 is read by a scanner (not illustrated).

Figure 5D:
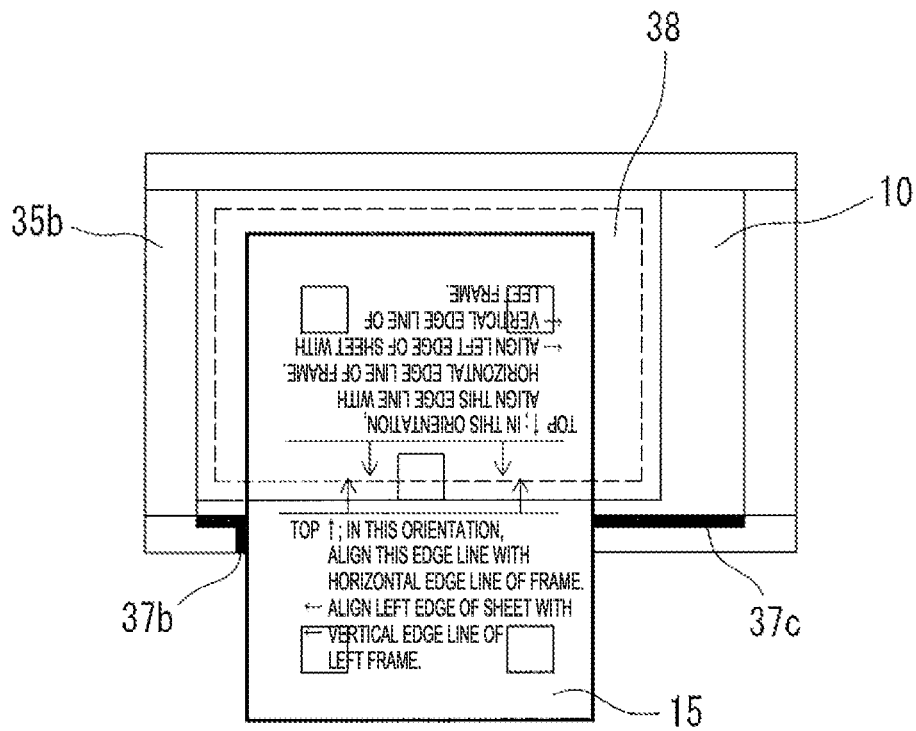
FIG. 5D is a diagram illustrating a state in which the cover sheet placed on the test sheet is seen through in the fifth embodiment of the disclosure.

FIG. 5D is a diagram illustrating a state in which the test sheet 15 according to the fifth embodiment of the disclosure is seen through the cover sheet placed over the test sheet 15. Referring to FIG. 5D, it can be seen that the test sheet 15 has been placed in the reading area as described in the description.

Referring to FIGS. 5A to 5D, when the left edge of the test sheet 15 is aligned with the alignment mark 37b and the cover sheet 38 covers the test sheet 15 with the origin aligned, the left edge of the test sheet 15 is positioned on the right side of the void portion 39 at the left edge of the cover sheet 38.

Also, the alignment mark 37b is positioned on the right side of the void portion 39 at the left edge of the cover sheet 38 when the cover sheet 38 is placed with the origin aligned.

The alignment mark 37c is positioned at the upper edge of the OC frame 11 at the lower edge of the OC glass 10.

The alignment line 48 adjacent to the test sheet 15 is positioned such that the upper edge of the test sheet 15 is arranged below the void at the upper edge of the cover sheet 38 when the test sheet 15 is placed with the alignment line 48 aligned with the alignment mark 37c or the position of the upper edge of the OC frame 11 at the lower edge of the OC glass 10 and covered with the cover sheet 38 with the origin aligned.

Figure 5E:
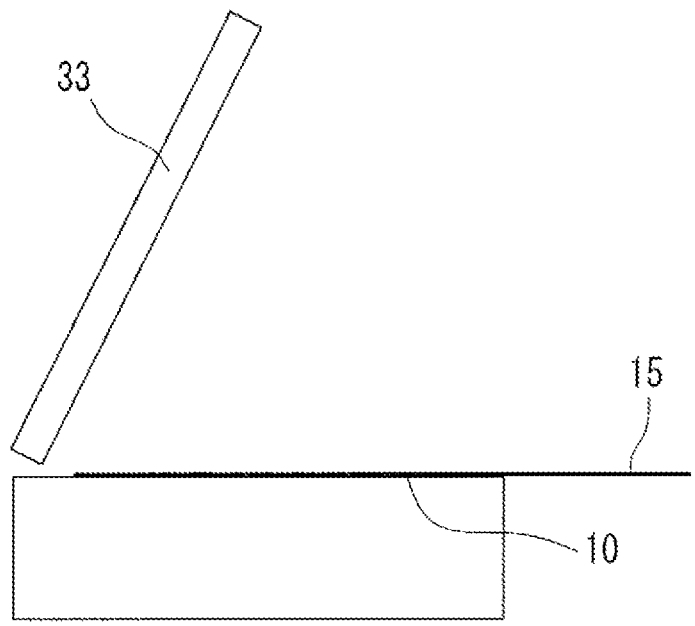
FIG. 5E is a diagram illustrating a reading method of a test sheet in which the OC cover is opened in the fifth embodiment of the disclosure.

The test sheet 15 may be read after covering the test sheet 15 with the cover sheet 38 as illustrated in FIG. 5C, or the test sheet 15 may be read by opening the OC cover 33 without covering the test sheet 15 with the cover sheet 38 as illustrated in FIG. 5E.

By placing the cover sheet 38 in this manner or by opening the OC cover 33, the upper surface of the test sheet 15 is not white, and the left and right edges of the upper portion of the test sheet 15 can be reliably detected.

As a result, an image forming apparatus can be provided that is capable of measuring the accurate distance between an edge of a sheet and the test patterns and capable of accurately aligning positions of images to be printed on the front and back sides of a sheet.

Sixth Embodiment

Figure 6A:
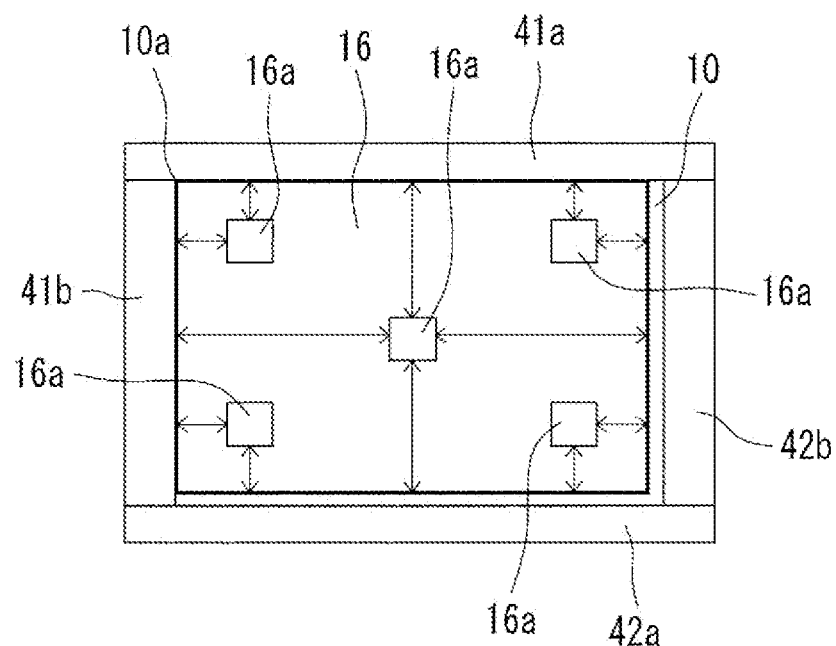
FIG. 6A is a diagram illustrating the placement of a test sheet on OC glass according to a sixth embodiment of the disclosure.

The sixth embodiment of the disclosure will now be described. The present embodiment is different from the previous embodiments in that four sides of the test sheet are detected at a time. Also in the present embodiment, the OC frame around the OC glass is provided on the entire periphery of the OC glass, and includes a first size guide 41a extending in the X-direction on the origin side of the OC glass and a second size guide 41b extending in the Y-direction. FIG. 6A illustrates a lower OC frame 42a (provided in the X-direction) and a right OC frame 42b (provided in the Y-direction) that are arranged to face the first size guide 41a and the second size guide 41b, respectively, with the reading area of the OC glass 10 interposed therebetween.

Figure 6B:
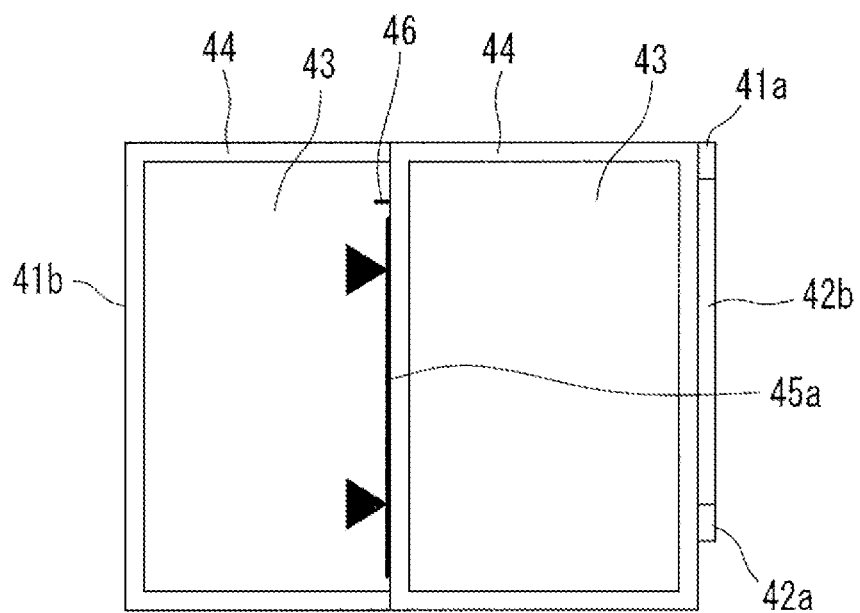
FIG. 6B is a diagram illustrating the placement of a cover sheet on a test sheet according to the sixth embodiment of the disclosure.
Figure 6C:
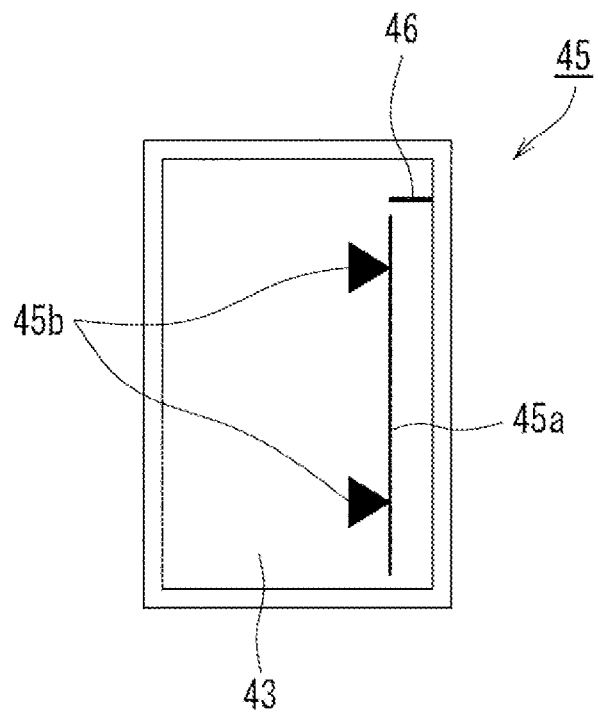
FIG. 6C is a diagram illustrating one cover sheet according to the sixth embodiment of the disclosure.

FIG. 6A is a diagram illustrating the placement of a test sheet 16 on the OC glass 10 according to the sixth embodiment of the disclosure; FIG. 6B is a diagram illustrating the placement of cover sheets 43 on the test sheet 16 according to the sixth embodiment of the disclosure; and FIG. 6C is a diagram illustrating one cover sheet 43 according to the sixth embodiment of the disclosure. Referring to FIGS. 6A to 6C, in the present embodiment, the test sheet 16 has an A3 size slightly smaller than that of the OC glass 10, and when the test sheet 16 is read by a scanner (not illustrated) of the reader, the four sides of the test sheet 16 are placed in a reading area of the OC glass 10 to read the test sheet 16.

Five test patterns 16a are provided on the test sheet 16 in the same manner as in FIG. 4A, and the distances from the edges of the four sides of the test sheet 16 to the test patterns 16a, which are indicated by lines with arrows in the drawing, are measured at once.

After the test sheet 16 is placed on the OC glass 10 as illustrated in FIG. 6A, the cover sheets 43 also having an A3 size are placed on the test sheet 16 in a direction orthogonal to the test sheet 16 so as to cover at least the first size guide 41a, the second size guide 41b, and the edge portions of the lower OC frame 42a and the right OC frame 42b adjacent to the OC glass 10, as illustrated in FIG. 6B.

The cover sheets 43 may or may not have void portions 44 on their outer peripheries. Here, two A3 cover sheets 43 are placed on the test sheet 16 in the horizontal direction to cover the entire OC glass 10.

FIG. 6C is a diagram illustrating one of the two A3 cover sheets 43, which is provided with a cover-sheet overlap mark (alignment mark) 45 for continuously arranging the two cover sheets 43. Referring to FIG. 6C, the cover-sheet overlap mark 45 includes a vertically extending line 45a provided in the vicinity of the right edge of the cover sheet 43 and a solid triangle mark 45b having a vertex in the right direction and provided with a space in the top-bottom direction along the line 45a.

FIG. 6C also illustrates an alignment mark 46 to be aligned with a size guide on the cover sheet 43, which will be described later.

Figure 6D:
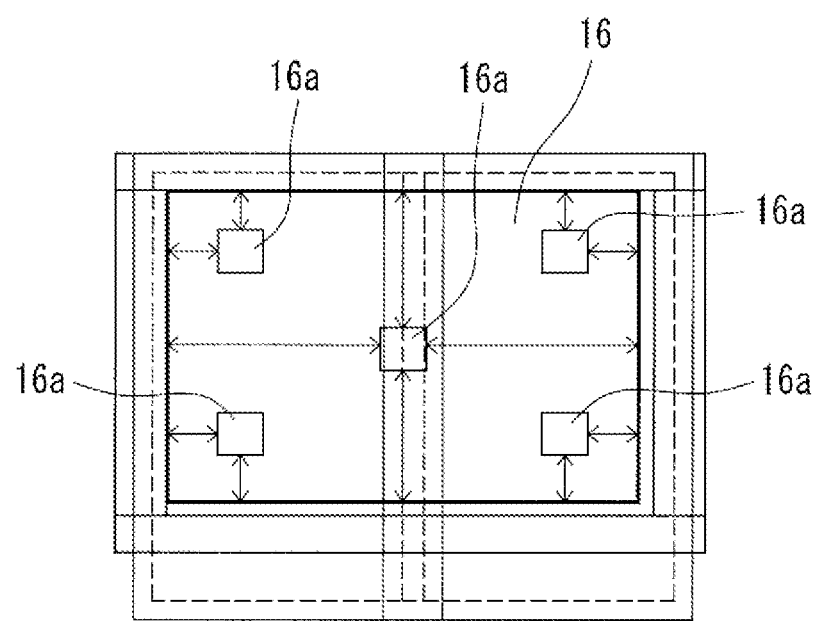
FIG. 6D is a diagram illustrating a state in which the cover sheet is seen through in the sixth embodiment of the disclosure.

When two A3 cover sheets 43 are placed continuously in the horizontal direction, the second A3 cover sheet 43 is placed on the right side of the line 45a and the solid triangle mark 45b illustrated in FIG. 6C. FIG. 6D is a diagram illustrating a state in which a cover sheet 43 is seen through when the cover sheet 43 is placed as described above. In this state, the test sheet 16 is read by a scanner (not illustrated).

A method of aligning the cover sheets 43 in the present embodiment will now be described. First, the left cover sheet 43 is aligned in the Y-direction (top-bottom direction). This alignment is performed by one of the following methods.

(1) Similar to the description of the alignment mark 18a on the cover sheet illustrated in FIG. 1B of the first embodiment, an alignment mark 46 for aligning with the size guide is provided at least on the left cover sheet 43 (see FIG. 6C), and the mark 46 is aligned with the edge of the first size guide 41a.

Figure 6E:
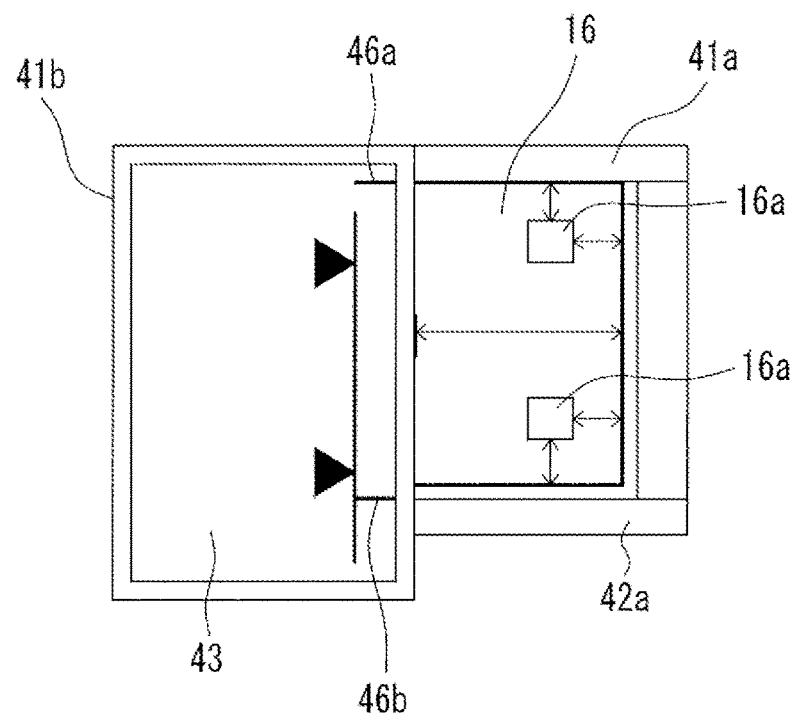
FIG. 6E is a diagram illustrating the placement of the cover sheet on the test sheet according to the sixth embodiment of the disclosure.

The alignment mark 46 on the left cover sheet 43 may be provided on the lower portion of the cover sheet 43 so as to be aligned with the OC frame 42a on the lower side of the reading area provided in parallel with the first size guide 41a (FIG. 6E illustrates a state in which the mark 46b is provided in the lower portion of the cover sheet 43 so as to be aligned with the line at the upper edge of the OC frame 42a on the lower side of the reading area).

(2) As described in the second embodiment, the first size guide 41a is provided with a step, and the upper edge of the left cover sheet 43 is aligned with the step at the upper edge of the first size guide 41a.

(3) In the same manner as described in the second embodiment, a mark is provided on the first size guide 41a, and the upper edge of the cover sheet or the alignment mark provided on the left cover sheet 43 is aligned with the mark drawn on the first size guide 41a.

(4) The upper edge of the left cover sheet 43 is aligned with the upper edge of the first size guide 41a.

Next, the X-direction of the left cover sheet 43 is aligned. This alignment is performed by one of the following methods.

(1) As described in the second embodiment, the second size guide 41b is provided with a step, and the left edge of the left cover sheet 43 is aligned with the step of the second size guide 41b.

(2) As described in the second embodiment, the second size guide 41b is provided with a mark, and the left edge of the left cover sheet is aligned with the mark drawn on the second size guide 41b.

Figure 6F:
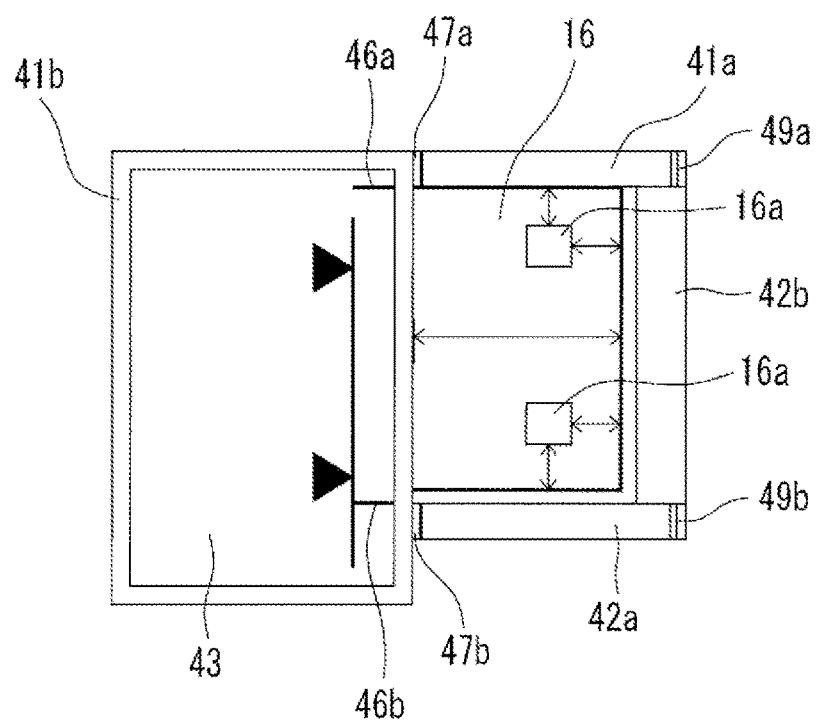
FIG. 6F is a diagram illustrating the placement of the cover sheet on the test sheet according to the sixth embodiment of the disclosure.

Alternatively, alignment marks 47a and 47b may be provided on the first size guide 41a and the OC frame 42a facing the first size guide 41a in parallel on the lower side of the reading area (see FIG. 6F), and aligned with the right edge of the cover sheet 43 on the left side.

(3) The left edge of the left cover sheet 43 is aligned with the left edge of the second size guide 41b.

Either the process of aligning the position of the upper edge of the left cover sheet 43 or the process of aligning the position of the left edge of the left cover sheet 43 may be performed first.

The top-bottom (upper edge) positions of the right cover sheet 43 are then aligned with the left cover sheet 43, and the left and right sides of the right cover sheet 43 are positioned by aligning the left edge of the right cover sheet 43 with a line 45a, to covers the entire reading area with the right cover sheet 43 and the left cover sheet 43. Alternatively, the right edge of the right cover sheet 43 may be aligned with alignment marks 49a and 49b provided on the first size guide 41a, and the OC frame 42a below the reading area provided parallel with the first size guide 41a (the intersecting portions of the first size guide 41a and the OC frame 42a, and the right OC frame 42b on the OC frame 42b on the right side of the reading area) (see FIG. 6F).

Figure 6G:
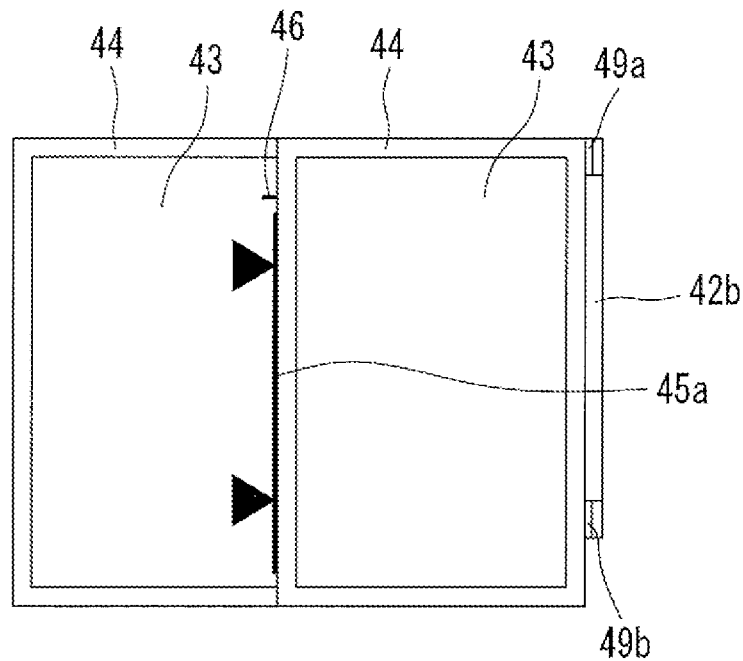
FIG. 6G is a diagram illustrating a state in which two cover sheet cover OC glass in the sixth embodiment of the disclosure.

Alternatively, a cover sheet overlap line 45a and the alignment marks 49a and 49b (see FIGS. 6F and 6G) provided on and the first size guide 41a, or the OC frame 42a below the reading area provided parallel with the first size guide 41a are positioned so that the right cover sheet 43 and the left cover sheet 43 together cover the entire reading area, or so that the right edge of the right cover sheet 43 is outside the right edge of the rectangular reading area.

Figure 6H:
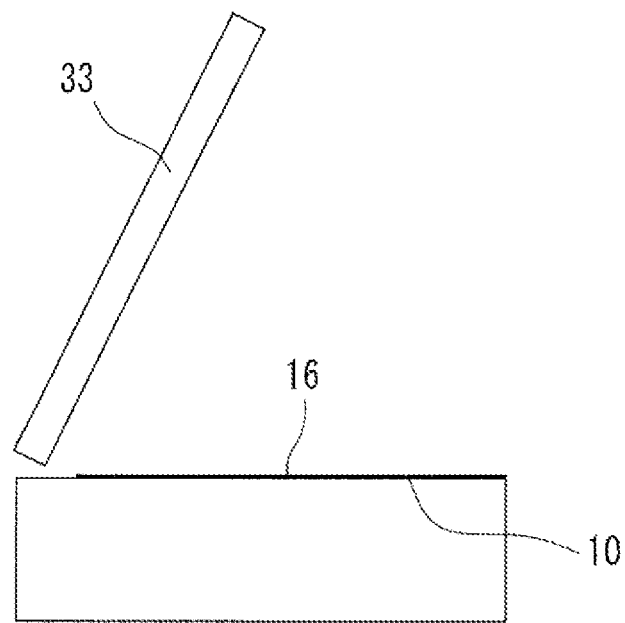
FIG. 6H is a diagram illustrating a reading state of a test sheet in which the OC cover is opened in the sixth embodiment of the disclosure.

In the above-described case, the test sheet 16 is read while being covered with the two cover sheets 43 continuously arranged in the vertical direction. Alternatively, the test sheet 16 may be read while the OC cover 33 covering the OC glass 10 is opened as illustrated in FIG. 6H.

The above embodiment has described the case where the test sheet is smaller than the reading area of the OC glass. Alternatively, to read the test sheet with the reader when size of the test sheet exceeds that of the OC glass, half of the long side of the test sheet may be read first, and then the remaining half may be read.

In each embodiment, the alignment marks on the cover sheet and the alignment marks on the frame surrounding the reading area are provided at such positions that the two side edges of the rectangular cover sheet on the origin side are positioned outside the two side edges of the rectangular reading area on the origin side when there is no void, and the void area at the two side edges of the cover sheet on the origin side are positioned at the same outside positions when there is a void.

The disclosure can be implemented in various other forms without departing from the spirit or principal features of the invention. Therefore, the embodiments as described above are mere examples and should not be interpreted restrictively. All modifications and variations that come within the equivalent scope of the claims are within the scope of the disclosure.

INDUSTRIAL APPLICABILITY

According to the disclosure, it is possible to provide an image forming apparatus and a method for reading a test sheet in an image forming apparatus, which are capable of accurately aligning the positions of images to be printed on the front and back sides of a sheet, and thus the disclosure is useful as an image forming apparatus.

What is claimed is:

1. An image forming apparatus comprising:
a reader that reads a test sheet printed by an image former, the image forming apparatus automatically adjusting a printing distance from a sheet edge based on a result of reading the test sheet, wherein the reader comprises:
a document platen glass on which a recording medium is placed; and
a document platen frame disposed around the document platen glass and including a first size guide and a second size guide, wherein:
the test sheet is placed on the document platen glass of the reader so as to be aligned with an origin between the first size guide and the second size guide,
the test sheet is read in a state in which a cover sheet having a rectangular shape is placed to cover the test sheet in such a manner that two sides of the cover sheet on a side of the origin are disposed outside a reading area on sides of the first size guide and the second size guide, and
the cover sheet is printed by the image former in a predetermined color other than white,
the cover sheet has a void area on four sides, and
when the test sheet is read, the void area on the two sides of the cover sheet on the side of the origin is disposed outside the reading area.

2. The image forming apparatus according to claim 1, wherein edges of the two sides of the cover sheet on the side of the origin are disposed at positions overlapping the document platen frame when the test sheet is read.

3. The image forming apparatus according to claim 1, wherein when the test sheet is read, two of the cover sheets are placed on the test sheet to cover an entirety of the reading area with the two cover sheets.

4. The image forming apparatus according to claim 3, wherein when the test sheet is read by the reader, four sides of the test sheet are placed on the document platen glass, and a print position on one side is read at a time.

5. The image forming apparatus according to claim 3, wherein when the two cover sheets are used, at least one of the two cover sheets has a mark for aligning a position of the other cover sheet.

6. An image forming apparatus comprising:
a reader that reads a test sheet printed by an image former, the image forming apparatus automatically adjusting a printing distance from a sheet edge based on a result of reading the test sheet, wherein the reader comprises:
a document platen glass on which a recording medium is placed; and
a document platen frame disposed around the document platen glass and including a first size guide and a second size guide, wherein:
the test sheet is placed on the document platen glass of the reader so as to be aligned with an origin between the first size guide and the second size guide,
the test sheet is read in a state in which a cover sheet having a rectangular shape is placed to cover the test sheet in such a manner that two sides of the cover sheet on a side of the origin are disposed outside a reading area on sides of the first size guide and the second size guide,
the cover sheet is printed in a predetermined color other than white,
the cover sheet has a mark for aligning a position of the cover sheet placed on the document platen glass, and
the mark for aligning the position of the cover sheet placed on the document platen glass is aligned with the document platen frame on the side of the origin.

7. An image forming apparatus comprising:
a reader that reads a test sheet printed by an image former, the image forming apparatus automatically adjusting a printing distance from a sheet edge based on a result of reading the test sheet, wherein the reader comprises:
a document platen glass on which a recording medium is placed; and
a document platen frame disposed around the document platen glass and including a first size guide and a second size guide, wherein:
the test sheet is placed on the document platen glass of the reader so as to be aligned with an origin between the first size guide and the second size guide,
the test sheet is read in a state in which a cover sheet having a rectangular shape is placed to cover the test sheet in such a manner that two sides of the cover sheet on a side of the origin are disposed outside a reading area on sides of the first size guide and the second size guide,
the cover sheet is printed by the image former in a predetermined color other than white, and
the document platen frame includes an alignment portion that aligns a position of the cover sheet.

\* \* \* \* \*